US011853245B2

(12) United States Patent
Davies

(10) Patent No.: US 11,853,245 B2
(45) Date of Patent: Dec. 26, 2023

(54) COMPUTING SYSTEM FRAMEWORK AND METHOD FOR CONFIGURATION THEREOF

(71) Applicant: XEROX CORPORATION, Norwalk, CT (US)

(72) Inventor: Daniel Davies, Palo Alto, CA (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 16/896,122

(22) Filed: Jun. 8, 2020

(65) Prior Publication Data

US 2020/0301865 A1 Sep. 24, 2020

Related U.S. Application Data

(63) Continuation of application No. 15/990,772, filed on May 28, 2018, now Pat. No. 10,678,730, which is a continuation of application No. 15/645,883, filed on Jul. 10, 2017, now Pat. No. 9,984,025, which is a continuation of application No. 14/512,341, filed on (Continued)

(51) Int. Cl.

| | |
|---|---|
| ***G06F 13/40*** | (2006.01) |
| ***G06F 13/42*** | (2006.01) |
| ***G06F 15/173*** | (2006.01) |

(52) U.S. Cl.

CPC ...... *G06F 13/4022* (2013.01); *G06F 13/4265* (2013.01); *G06F 15/17362* (2013.01)

(58) Field of Classification Search

CPC ............. G06F 13/4022; G06F 13/4265; G06F 15/17362

See application file for complete search history.

(56) References Cited

U.S. PATENT DOCUMENTS 5,483,536 A 1/1996 Gunji et al.
6,018,782 A * 1/2000 Hartmann ........... G06F 15/7842 709/251

(Continued)

OTHER PUBLICATIONS

Park, Jay, "Open Compute Project." Data Center v1.0 pp. 1-15. Apr. 7, 2011. Retrieved from Internet URL: http://web.archive.org/web/20131101190202/http:/opencompute.org/assets/Uploads/DataCenter-Mechanical-Specifications.pdf [retrieved Apr. 14, 2015].

(Continued)

*Primary Examiner* — Idriss N Alrobaye
*Assistant Examiner* — Ronald T Modo
(74) *Attorney, Agent, or Firm* — Krista A. Wittman

(57) ABSTRACT

A computing system framework and method for configuration thereof are provided. A plurality of processing modules are accessed. Each processing module includes a plurality of processing nodes and each processing node is associated with an intra-module port and an inter-module port. A plurality of intra-module networks are formed. Each intra-module network includes connections between at least a portion of the processing nodes in one of the processing modules via the associated intra-module ports. An enclosed shape of the processing modules is formed by connecting at one inter-module port on each processing module to one inter-module port on an adjacent processing modules. A cable is linked between one of the inter-module ports of one processing module of the enclosed shape to an inter-module port of another processing module of a different group of interconnected processing modules.

12 Claims, 12 Drawing Sheets

Related U.S. Application Data

Oct. 10, 2014, now Pat. No. 9,703,738, which is a continuation-in-part of application No. 14/313,922, filed on Jun. 24, 2014, now Pat. No. 9,558,138.

(56) References Cited

U.S. PATENT DOCUMENTS

2005/0271035 A1* 12/2005 Cohen ..................... H04L 12/18 370/351
2009/0268746 A1 10/2009 Ogasahara et al.
2012/0219011 A1* 8/2012 Lu ........................... H04L 12/66 370/419
2014/0059266 A1* 2/2014 Ben-Michael .......... G06F 13/14 710/313
2014/0254353 A1* 9/2014 Ye ........................... H04L 45/50 370/228
2014/0270762 A1* 9/2014 Li ........................... H04L 45/02 398/45
2015/0117267 A1* 4/2015 Lih .................. G06F 15/17362 370/258

OTHER PUBLICATIONS

Nutanix Data Sheet, “Nutanix Virtual Computing Platform.” Nutanix Corporation Nov. 2013. Retrieved from Internet URL: http://web.archive.org/web/20131228054432/http:/go.nutanix.com/rs/nutanix/images/Datasheet_Official.pdf [cached on Dec. 28, 2013].
Al-Fares et al., “A Scalable, Commodity Data Center Network Architecture.” Department of Computer Science and Engineering, University of California. Proceedings of SIGCOMM. (Aug. 17-22, 2008).
Bilal et al. “Quantitative comparisons of the state-of-the-art data center architectures.” Concurrency and Computation: Practice and Experience. (2012).

* cited by examiner

COMPUTING SYSTEM FRAMEWORK AND METHOD FOR CONFIGURATION THEREOF

CROSS-REFERENCE TO RELATED APPLICATIONS

This non-provisional patent application is a continuation of U.S. Pat. No. 10,678,730, issued Jun. 9, 2020, which is a continuation of U.S. Pat. No. 9,984,025, issued May 29, 2018, which is a continuation of U.S. Pat. No. 9,703,738, issued Jul. 11, 2017, which is a continuation-in-part of U.S. Pat. No. 9,558,138, issued Jan. 31, 2017, the priorities of which are claimed and the disclosures of which are incorporated by reference.

FIELD

This application relates in general to computing system frameworks used in datacenters and, in particular, to a computing system framework and method for configuration thereof.

BACKGROUND

Datacenters have experienced rapid growth, and the growth rate is expected to accelerate. The torrid development is fueled by an increasing demand, and made possible by reduced costs of the components of datacenters. Datacenter are chiefly constructed from processing nodes, storage nodes, and networks that connects the processing nodes and the storage nodes. Both the processing nodes and the storage nodes have become smaller, less expensive, and more energy efficient, allowing datacenters to pack more processing and storage nodes into smaller spaces to meet the increasing demand for data processing and storage. As the processing nodes consume more and more data at higher rates, and retrieve and store the data from and into the storage nodes, the networks must transmit more and more data at higher speeds between increasing numbers of connections. As a result, the costs of the networks have become significant, in relationship to the falling costs of the processing and storage nodes. One estimate puts the cost of the networks, composed mostly of network switches and cables, at ~50% of new datacenters.

In a traditional datacenter, processing nodes are typically connected via a single primary network. Secondary networks, if any, are primarily used for administrative purpose and are not a topic of discussion here. Each processing node may have one or more locally attached long term storage devices such as hard disks or solid state disks. A processing node accesses its long term storage device to satisfy its internal needs and often on behalf of a system-wide distributed storage system. A number of processing nodes, each with one or more long term storage devices, are packaged in a processing module. The computing power of the datacenter is scaled up primarily by adding processing modules. This construction framework places a heavy demand on the primary high-speed network, since every processing node added relies on the primary high-speed network to communicate with existing processing nodes. The capacity of the high-speed network has to increase in proportion to the numbers of processor nodes added. Because processing nodes are becoming faster and less expensive, while fast connectivity is getting more expensive, high-speed network costs have become the bottleneck that impedes the scaling up of datacenter computing capacity at low cost.

For example, the traditional network architecture used in datacenters is a three-tier system that follows a multi-rooted tree topology composed of three layers of network switches, namely access, aggregate, and core layers, from low to high. The access layer directly reaches root servers and interconnects into the aggregate layers. The access layer switches ultimately connect to each other by the core layer switches, which are also responsible for connecting the datacenter to the Internet. The three-tier legacy system is difficult to scale up and the higher layers of the three-tier are highly oversubscribed. In addition, fault tolerance, energy efficiency, and cross-sectional bandwidth are problematic.

In a further example, the Fat Tree datacenter architecture attempts to address the oversubscription and cross section bandwidth problems faced by the traditional three-tier datacenter network architecture. The Fat Tree topology offers 1:1 oversubscription ratio and full bisection bandwidth. However, the Fat Tree topology employs a much higher number of network switches than the three-tier legacy system and is also difficult to scale up.

In a still further example, the DCell architecture adopts a server-centric hybrid architecture where one server is directly connected to many other servers. The DCell topology relies on a recursively built hierarchy of cells arranged in multiple levels, where a higher level cell contains multiple lower layer cells, and servers within a cell is assigned to their own switches. While easily scalable, the cross section bandwidth and network latency are major issues in DCell architecture. In addition, DCell requires multiple network interfaces on each server to achieve scalability.

Facebook has set out the Open Compute Project, aiming to develop datacenter servers that are both energy- and cost-efficient. The solutions that the Open Compute Project promotes include vanity-free design of hardware, open vault storage building blocks, mechanical mounting system, and high disk densities. The result of these efforts are datacenters made of vanity-free servers that are up to 38% more energy-efficient and up to 24% less expensive to build and run than traditional server hardware. However, the solutions practiced in the Open Compute Project amounts to optimization of packing processor nodes. The fundamental dichotomy between a processing function and a storage function, along with the resulting network traffic between the processing nodes that dedicated to computing and storage devices dedicated for storage, remains unchanged.

Nutanix has developed Nutanix Virtual Computing Platform that incorporates a high speed storage (Server Flash) and low speed storage (Hard Disk Storage) locally to processing nodes, to increase the speed and efficiency of computing for datacenters. However, no fundamental network improvement is revealed.

Thus there remains a need for satisfying the demand for high bandwidth and low latency connectivity in datacenters while adding more processing nodes to accommodate the ever-increasing need for more computing power. Preferably, when new processing nodes are added into an existing computer system, the new processing nodes contain their networking functionality and require little or no dedicated network equipment, such as network switches, to be installed, so that computing power and network capacity grows along with the addition of the processing nodes. This paradigm of datacenter network architecture envisions unifying data processing, storage, and transmission through a data processing node fabric that contains its own networking functionality, thus obviates or minimizes the need for network switches while meeting the demands for computing power, storage capacity, low-cost, easy scalability, and robustness, and low energy consumption.

Moreover, this paradigm may incorporate network switches into the unified storage, processing, and network switching fabric instead of completely eliminating them. Network switches occupy the same place in the network as hubs. Unlike hubs, network switches examine and process each data packet accordingly rather than simply repeating the packet to all ports. Network switches map the network addresses of the nodes residing on each network segment and then allow only the necessary traffic to pass through the switch. When a packet is received by a switch, the switch examines the destination and source hardware addresses and compares them to a table of network segments and addresses. If the segments are the same, the packet is dropped or "filtered;" if the segments are different, then the packet is "forwarded" to the proper segment. Additionally, switches prevent bad or misaligned packets from spreading by not forwarding them. Thus, incorporating network switches into the unified storage, processing, and network switching fabric may facilitate control of data traffic flow and enhance the overall performance of datacenter computer system. More importantly, existing datacenters use switches extensively, thus scaling up existing datacenters with, or migrating existing datacenters to, processing nodes containing their own networking functionality would be made easier and cost-efficient if network switch can be incorporated efficiently into the connecting schemes that heavily replies upon the networking functionality effected through the processing nodes.

Thus, there remains a need for a system and a method to efficiently incorporate network switches into a datacenter network system where at least some of the processing nodes containing their own networking functionality.

SUMMARY

A system and method for making and using a computing system framework with unified storage, processing, and network switching fabrics are provided. Processing nodes, either physical or virtual, are associated with intra-module ports, inter-module ports, and local storage devices. A plurality of processing nodes are linked through intra-module ports to form processing modules. A plurality of the processing modules are further connected through inter-module ports to form the computing system. Several inter-module connection schemes are described, each of which can be adapted to use with existing network packet routing algorithms. Each processing node needs only to keep track of the states of its directly connected neighbors, obviating the need for a high-speed connection to the rest of the processing nodes within the system. As a result, dedicated network switching equipment is not needed and network capacity grows naturally as processing nodes are added. Furthermore, network switches may be incorporated into the network connections to facilitate network traffic control.

One embodiment provides a computing system framework with a unified storage, processing, and network switching fabrics. The system includes four or more processing nodes. The system also includes four or more intra-module ports, each intra-module port being uniquely associated with one of the processing nodes. The system also includes a plurality of inter-module ports, each inter-module port being associated with one of the processing nodes. The system also includes a plurality of processing modules, each processing module comprising two or more of the processing nodes uniquely selected from the plurality of the processing nodes, wherein each of the processing nodes is comprised in only one of the processing modules. The system also includes a plurality of intra-module networks, wherein the processing nodes within each processing module are fully inter-connected. Finally, the system includes an inter-module network comprising at least one connection between one inter-module port on one processing module and another inter-module port on another processing module. The connection may be made via a cable or a network switch, or both. A processing module may simulate a network switch.

A further embodiment provides a computing system framework and method for configuration thereof. A plurality of processing modules are accessed. Each processing module includes a plurality of processing nodes and each processing node is associated with an intra-module port and an inter-module port. A plurality of intra-module networks are formed. Each intra-module network includes connections between at least a portion of the processing nodes in one of the processing modules via the associated intra-module ports. An enclosed shape of the processing modules is formed by connecting at one inter-module port on each processing module to one inter-module port on an adjacent processing modules. A cable is linked between one of the inter-module ports of one processing module of the enclosed shape to an inter-module port of another processing module of a different group of interconnected processing modules.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Infrastructure

Figure 1:
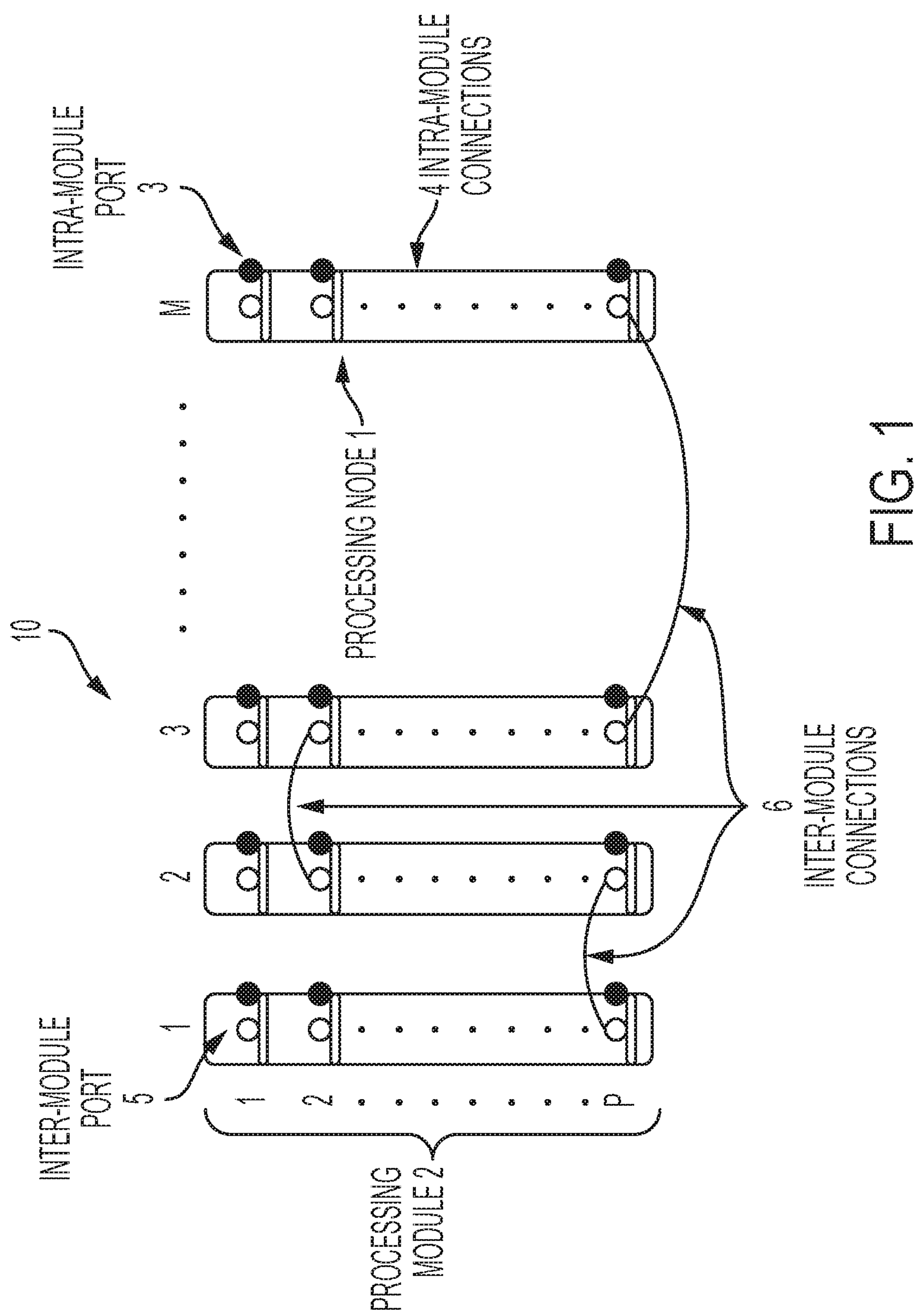
FIG. 1 is a block diagram showing a computing system framework with unified storage, processing, and network switching fabrics in accordance with one embodiment.

In one embodiment, a computing system framework incorporates multiple processing nodes organized in a two-level structure. At the first level, a plurality of processing nodes forms a processing module; at the second level, a number of processing modules forms the computing system. FIG. 1 is a block diagram showing a computing system framework (10) with unified storage, processing, and network switching fabrics in accordance with one embodiment.

A processing node (1) may be a physical node or a virtual node. In one embodiment, a physical node may implement several virtual nodes. In the following description, a processing node refers to both a physical node and a virtual node.

A processing node (1) can be a processing element, a memory controller, a memory, a storage controller, one or more storage devices, and interfaces to intra-module and inter-module ports. In a physical processing node, these are physical devices. In a virtual processing element, the functions of these devices are emulated. Every node has a unique network address. A processing node (1) typically is connected to its own storage device, which may satisfy the internal needs of the processing node or serve on behalf of a system-wide distributed storage system.

A plurality of processing nodes makes up a processing module (2). Each processing node (1) is typically equipped with a high-speed data transfer port termed an intra-module port (3). Each processing node in a processing module is typically connected to each and every other processing node within the same processing module via the intra-module port (3). In another word, the processing nodes within each processing module are fully inter-connected. These connections within one processing module through intra-module ports are termed intra-module connections (4). An intra-module network is made from connection or connections formed from each processing node within a processing module to the rest of the processing nodes within the same processing module. The intra-module connections (4) allow the exchange of data packets between two processing nodes within the same processing module to be completed in a single step. In one embodiment, the intra-module ports are implemented using PCI Express Serial RapidIO or other technologies that take advantage of low error rates and short interconnection distances to provide very compact, high-bandwidth, reliable and inexpensive connectivity. In a further embodiment, the intra-module connections are effected by using at least one of any technology and topology including a ring, a bus, a star, a mesh and a collection of one or more crossbar switches.

In a ring topology, every processing node has exactly two neighbors for communication purposes. All messages may or may not travel through a ring in the same direction. In a bus topology, bus networks (not to be confused with the system bus of a computer) use a common backbone to connect all processing nodes or devices. The backbone functions as a shared communication medium that processing nodes or devices attach or tap into with an interface connector. A star network features a central connection point called a “hub” that connects to the rest of the processing nodes. In a mesh topology, processing nodes are connected with many redundant interconnections. A hybrid topology comprises a combination of any two or more network topologies.

In additional to the intra-module port (3), a processing node may also be equipped with a networking port, termed an inter-module port (5), that connects to a processing node located in another processing module via another inter-module port. These connections between two processing modules via two inter-module ports located on two processing nodes from two separate processing modules, respectively, are termed an inter-module connection (6). Data packets may be sent from one processing module to another processing module in one step when the two processing modules are directly connected via an inter-module connection. The inter-module connection is typically implemented via a cable linking two inter-module ports, or cable link for short. In one embodiment, the inter-module ports are conventional networking ports such as Ethernet. In a further embodiment, the inter-module networking ports are physically accessible from outside the module.

Thus the computing system (10) includes a plurality of processing modules, inter-connected through a network of inter-module connections effected through inter-module ports. The processing modules in turn include a number of intra-connected processing nodes. In one embodiment, one processing node carries one inter-module port, and one inter-module port makes one inter-module connection, thus a processing module typically makes a limited number of inter-module connections, not exceeding the number of inter-module ports present in the processing module. The computing system thus constructed alleviates the pressure for high-speed traffic within the computing system as the number of processing nodes grow, since a processing node does not connect directly to and keep track of all the other processing nodes within a primary network; instead, each processing node needs only to keep track of the states of its directly connected neighbors. The computing system thus constructed also simplifies the control of data traffic among the processing nodes located on different processing modules, by sending a data packet through a limited numbers of intra-module-inter-module paired steps.

The computing system framework includes at minimum two layers of connections: intra-module connection and inter-module connection. More layers of inter-module connections may be provided, depending the connection schemes of the inter-module connection, as will be described infra. A group of processing modules that are interconnected through a connection scheme, as described infra, is termed a block. Multiple blocks, whether formed from the same or a different scheme, may be further connected through inter-module connections to form an upper block. Blocks or upper blocks ultimately aggregate into a system. Note that for the purpose of discussion, a three-tier system is referenced that includes: 1) processing modules formed from processing nodes, 2) blocks formed from the processing modules, and 3) system formed from the blocks, although systems with more than three-tier are possible by instituting multiple levels of blocks. Accordingly, unless otherwise explicitly stated, each reference to a system will apply equally and interchangeably to any number of block layers.

Figure 2:
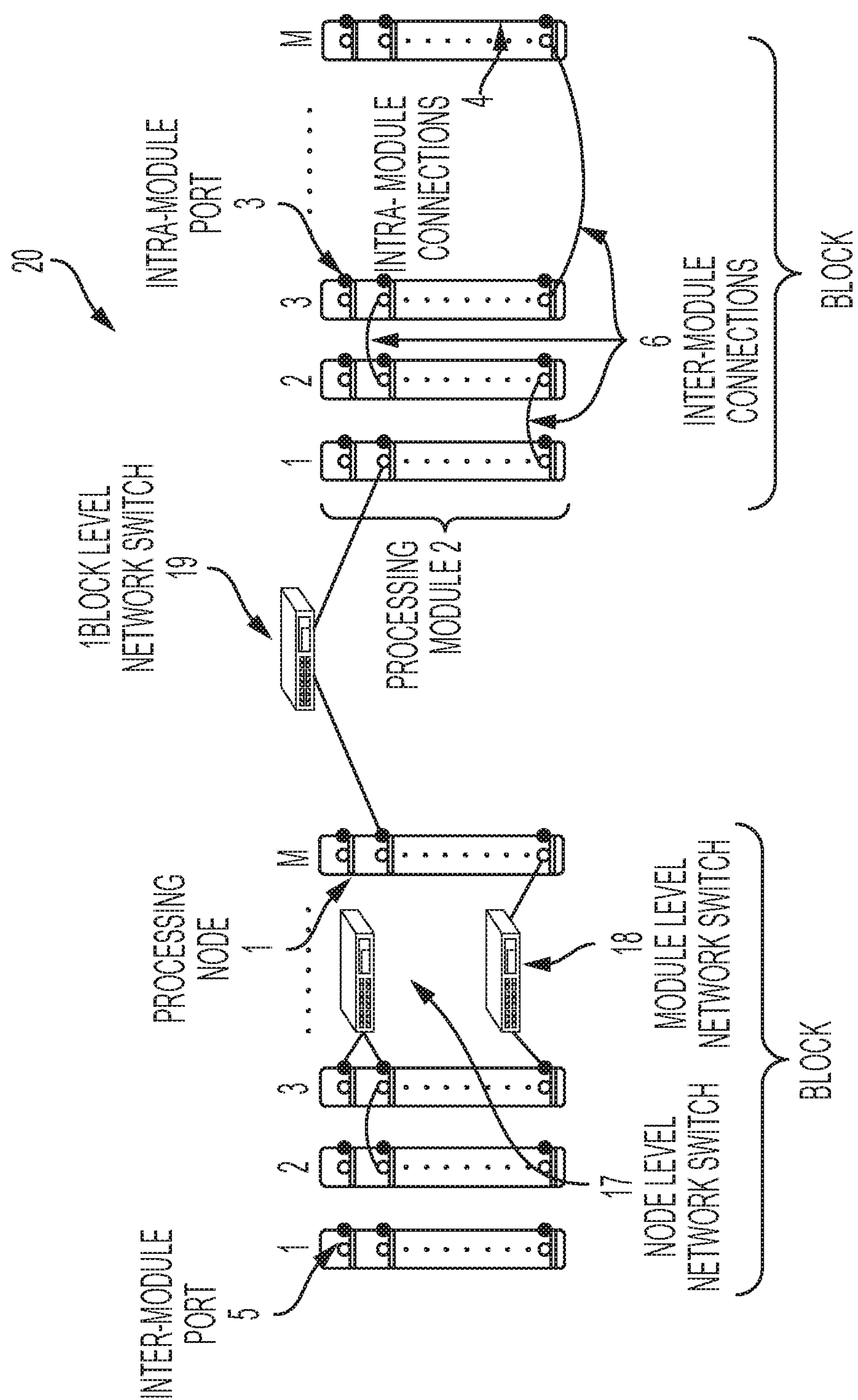
FIG. 2 is a block diagram showing a computing system framework with unified storage, processing, and network switching fabrics incorporating network switches in accordance with one embodiment.

A further layer of data packet traffic control between may be accomplished through the inclusion of at least one network switch. A network switch is a multi-port bridge, i.e., an active element working on layer 2 of the Open Systems Interconnection model. FIG. 2 is a block diagram showing a computing system framework with unified storage, processing, and network switching fabrics incorporating network switches in accordance with one embodiment. At least one network switch can be used in a computing system. A network switch can be used to effect connections between processing nodes within a processing module, processing modules within a block, blocks within a system, or a combination thereof.

The computing system framework (20) contains three levels, although more levels are possible as appreciated by people skilled in the art. In the first level, multiple processing nodes (1) form a processing module (2); in the second level, multiple processing modules form a block; in the third level, multiple blocks form the system. Within the processing module (2), intra-module ports (3) located on each of the processing nodes form intra-module connections (4). Between two processing modules (2), inter-module ports (5) form inter-module connections (6). Inter-module connections may also connect between blocks (not shown).

In addition, at least one of the intra-module connections can be implemented using a network switch or circuitry and protocols that are used on network switches. An intra-module connection implemented via a network switch or circuitry and protocols used on a network switch is termed node level network switch connection, and a network switch thus used is termed a node level network switch (17). At least one of the inter-module connections can be implemented using a network switch, or circuitry and protocols that are used on network switches. An inter-module connection implemented via a network switch or circuitry and protocols used on a network switch is termed a module level network switch connection or a block level network switch connection, depending on the layer of connections the network switch serves. If the network switch serves the connections among processing modules within a block, the network switch is termed a module level network switch (18); if the network switch serves the connections among processing modules residing on two blocks, the network switch is termed a block level network switch (19).

In a further embodiment, the inter-module connections are implemented with a hybrid of cable links and network switches. The inclusion of network switches reduces the number of length of cables required, addresses scalability concerns, and provides an additional layer of data packet traffic control.

In a still further embodiment, the node level network switches, module level network switches, and block level network switches may be present in a computing system singly or in combination, or in combination with cable links, to form connections to facilitate, modify, and amend data packet transfer. The connections may be implemented using topology such as a ring, a bus, a star, a mesh, a tree, or a hybrid. In one embodiment, a tree topology is used with the node level network switches as roots. A tree topology integrates multiple star topologies together onto a bus. This bus/star hybrid approach supports future expandability of the network much better than a bus or a star. In a hybrid topology, a combination of any two or more network topologies are used.

A processing module contains multiple processing nodes, each of which contains an inter-module port. Thus a processing module is a multi-port device and can be used as a network switch. In one embodiment, a processing module serves as a network switch. Such a switch is termed a processing module-simulated switch.

A processing module-simulated switch can resides at the levels of node level network switches, module level network switches, block level network switches, or a combination thereof. Processing module-simulated switches residing at the node level, module level, and block level may form connections to facilitate, modify, and amend data packet transfer. A computing system may also implements both networks switches and processing module-simulated switches at the node level, module level, block level, or a combination thereof.

Connection Schemes with Cable Links

Examples of inter-module connection schemes are described infra. These examples are illustrative and not meant to be limiting. Other configurations, topologies, arrangements, and permutations of connections, ports and processing modules are possible, as would be recognized by one skilled in the art.

To facilitate the illustration, the following examples assume a computing system that includes M processing modules, with each processing module having P inter-module ports, with M and P both are integers. If P equals to zero, there are no connections between processing modules. Such a system has a severely limited utility. When P equals to 1, the system would include pairs of linked modules. Such a system has marginally greater utility than having entirely unlinked processing modules in that two modules might be more effective than one when working on an assignment. When P is greater than 1, the system can form a large network of linked processing modules and is more advantageous. The computing system's advantage in transfer data packet increases when the number of inter-module connections increases.

In general, the number of inter-module ports associated with each module does not need to be equal. Each inter-module port is associated with one processing node, and each inter-module port is either disconnected, or connected to another inter-module port on another processing module. For example, a computing system may have M processing modules, with each processing modules having a minimum of P inter-module ports. In such a system, the inter-module ports beyond P may remain unconnected, or connected to other inter-module ports.

Randomly Connecting Inter-module Ports on One Processing Module to Inter-module Ports on other Processing Modules In one embodiment, inter-module ports located on one processing module are randomly connected to inter-module ports located on other processing modules. The advantage of this scheme is the simplicity, therefore low cost, of manufacture and maintenance. The disadvantage of this scheme is the risk that some processing modules may be disconnected whereas some other processing modules may be over-connected due to the random nature of forming the connections. However, the same randomness also ensures that when the number of processing modules are large, as they tend to be in a modern datacenter setting, there will not be a severe problem arising from over- and under-connection of the processing modules. According to the Law of Large Numbers, the average of the results obtained from a large number of trials of the same experiment should be close to the expected value, and will tend to become closer as more trials are performed. Thus, as M increases, the number of different processing modules connected to a particular processing module is increasingly likely to be P.

In a further embodiment, the number of inter-module ports in each of the processing module might be different. In still a further embodiment, some of the inter-module ports are disconnected.

Using a Binary Spanning Connection Scheme to Connect Inter-module Ports on One Processing Module to Inter-module Ports on other Processing Modules In one embodiment, a binary spanning system is used to connect an inter-module port located on one processing module to an inter-module port located on another processing module. Under this scheme, the processing modules, whose number M is a power of 2, are first divided into M/2 groups, resulting in two processing modules/per group. Within each of the M/2 groups, the two processing modules are connected via their first inter-module ports. Next, the processing modules are divided into M/4 groups, with four processing modules/per group. Within each of the M/4 groups, the four processing modules are connected, 1 to 3, and 2 to 4, respectively, via their second inter-module ports. Next, the processing modules are divided into M/8 groups, with eight processing modules/per group. Within each of the M/8 groups, the eight processing modules are connected, 1 to 5, 2 to 6, 3 to 7, and 4 to 8, respectively, via their third inter-module ports. The connections are continuously built up in such a pattern until the number of inter-module ports used reaches P or $\log_2 M$, whichever is smaller.

Figure 3:
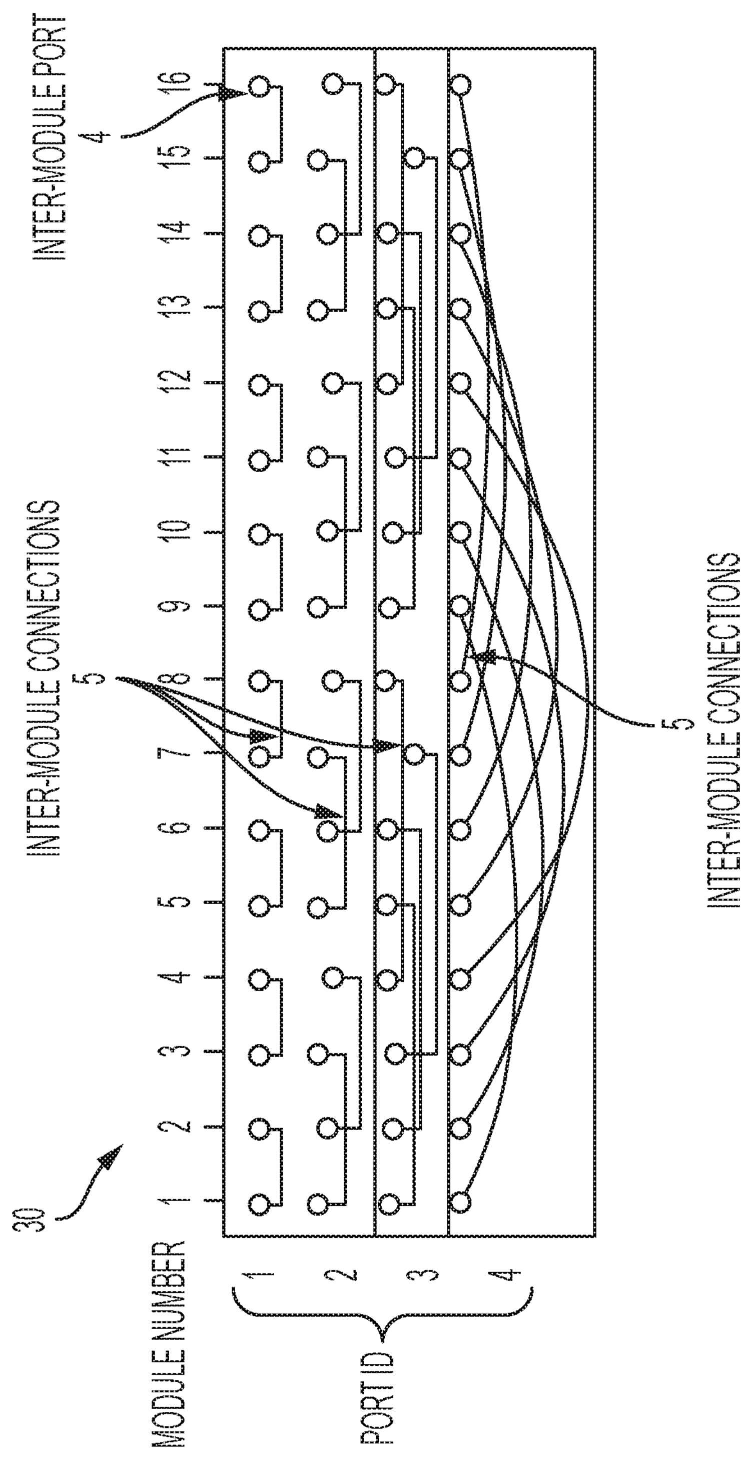
FIG. 3 is an illustration showing, by way of example, a binary spanning connection scheme, illustrated as a computing system framework that includes 16 processing modules (M=16) with 4 inter-module ports (P=4) on each of the processing modules.

This binary spanning connection scheme is better illustrated through an example. FIG. 3 is an illustration showing, by way of example, a binary spanning connection scheme, illustrated as a computing system framework that includes 16 processing modules (M=16) with four inter-module ports (P=4) on each of the processing modules. The processing modules are abbreviated to modules 1, 2, . . . , and 16. The inter-module ports are numbered 1, 2, 3, and 4. The person skilled in the art can appreciate that the number of processing modules and inter-module connection ports are for illustrative purpose only and not limiting. Other numbers of M and P are possible. In each of the M modules, there are various numbers of processing nodes that are connected through intra-module connections.

Thus, under the binary spanning scheme, the following pairs of the processing modules are connected via inter-module port 1: 1 to 2, 3 to 4, 5 to 6, 7 to 8, 9 to 10, 11 to 12, 13 to 14, and 15 to 16 (FIG. 3); the following pairs of processing modules are linked via inter-module port 2: 1 to 3, 2 to 4, 5 to 7, 6 to 8, 9 to 11, 10 to 12, 13 to 15, and 14 to 16 (FIG. 3); the following pairs of processing modules are linked via inter-module port 3: 1 to 5, 2 to 6, 3 to 7, 4 to 8, 9 to 13, 10 to 14, 11 to 15, and 12 to 16 (FIG. 3); finally, the following pairs of processing modules are linked via inter-module port 4: 1 to 9, 2 to 10, 3 to 11, 4 to 12, 5 to 13, 6 to 14, 7 to 15, and 8 to 16 (FIG. 3).

Thus, the binary spanning scheme can be generalized as a system with M processing modules and P or more inter-module ports in each processing modules. Each inter-module port is associated with exactly one processing node. M is a power of 2. The inter-module connections are implemented according to the following rule:

i. Port 1 on module 2N+1 is connected to Port 1 on module 2N+2, where N is [0, 1, . . . , (M/2)−1].
ii. Ports 2 on modules 4N+1 and 4N+2 are connected to Ports 2 on modules 4N+3 and 4N+4, respectively, where N is [0, 1, . . . , (M/4)−1].
iii. In general, Ports P on modules ($2^P$*N+1) through ($2^P$*N+$2^{P-1}$) are connected to Ports P on modules ($2^P$*N+$2^{P-1}$+1) through ($2^P$*N+$2^P$), respectively, where N is [0, 1, . . . , (M/$2^{P+1}$)−1], and P is [1, 2, . . . , P].

Thus, the binary spanning connection scheme represents a connecting scheme where all processing modules are first connected pairwise via the first inter-module ports; subsequently each of the pairs is further paired up with another pair to form a pair of pair via the second inter-module ports; and the pairing continues further until unused inter-module ports are exhausted or when all the processing modules are paired up into one pair. Accordingly, in one embodiment, the connection among the processing modules are made by: 1, pairing one of the processing modules with another one of the processing modules and connecting the paired processing modules to form a connected pair via inter-module ports on the processing nodes within the paired processing modules; 2, pairing one of the connected pair with another one of the connected pair and connecting the pairs to form a further connected pair via unused inter-module ports on the further connected pairs; and 3, further pairing and connecting the further connected pairs, until all of the inter-module ports have been utilized, or all processing modules are connected.

When P, the number of inter-module ports, equals to $\log_2 M$, the computing system may be fully connected, that is, each processing-module is connected to another processing module, either directly or indirectly. The number of total connections equals to (M*P)/2.

When P is smaller than $\log_2 M$, the computing system will not be fully connected. For example, when P equals to $\log_2 M-1$, the computing system will comprise of two halves, each halve is internally connected but does not connect the other half. When P equals to $\log_2 M-2$, the computing system will comprise of four quadrants, each quadrant is internally connected but does not connect the other quadrants. When P equals to $\log_2 M-3$, the computing system framework will split into eight equal sections of internally connected aggregates of processing modules. Because the computing system's power generally increases when the processing modules are better connected, it is advantageous to have a P number close to $\log_2 M$.

When P is larger than $\log_2 M$, the computing system may be fully connected using the $\log_2 M$ number of the inter-module ports, and the remaining inter-module ports, by the number of $P-\log_2 M$ per processing module, can either remain unconnected or form additional connections among the inter-module ports. In one embodiment, additional connections are randomly formed within the computing system. In a further embodiment, additional connections are formed by two computing systems that are connected by the binary spanning scheme In a further embodiment, the number of inter-module ports in each of the processing modules might be different from one another. The binary spanning scheme does not require the number of inter-module ports being equal among the processing modules. In one embodiment, the numbers of inter-module ports are different among the processing modules in a binary spanning scheme can still be implemented by identifying the smallest number of the inter-module ports on the processing modules within a computing system, and assigning the smallest number as the number of the inter-module ports for all the processing modules within the computing system.

Using a Ring System Connection Scheme to Connect Inter-module Ports on One Processing Module to Inter-module Ports on Other Processing Modules A ring system is a connection scheme that has the common feature of connecting all the processing modules within a block or a system in a series of linearly connected processing modules with the beginning and the end of the series further linked to each other to form a closed circle, or ring, using two inter-module ports from each of the connected processing modules. A connection system in which every module utilizes exactly two ports, one connecting to the previous module and one connecting to the next module, is termed a basic ring system. A basic ring system may be modified by introducing additional connections between the processing modules residing on the ring. A ring system, unless specified, refers to both the basic and the modified ring systems, as described infra.

Figure 4:
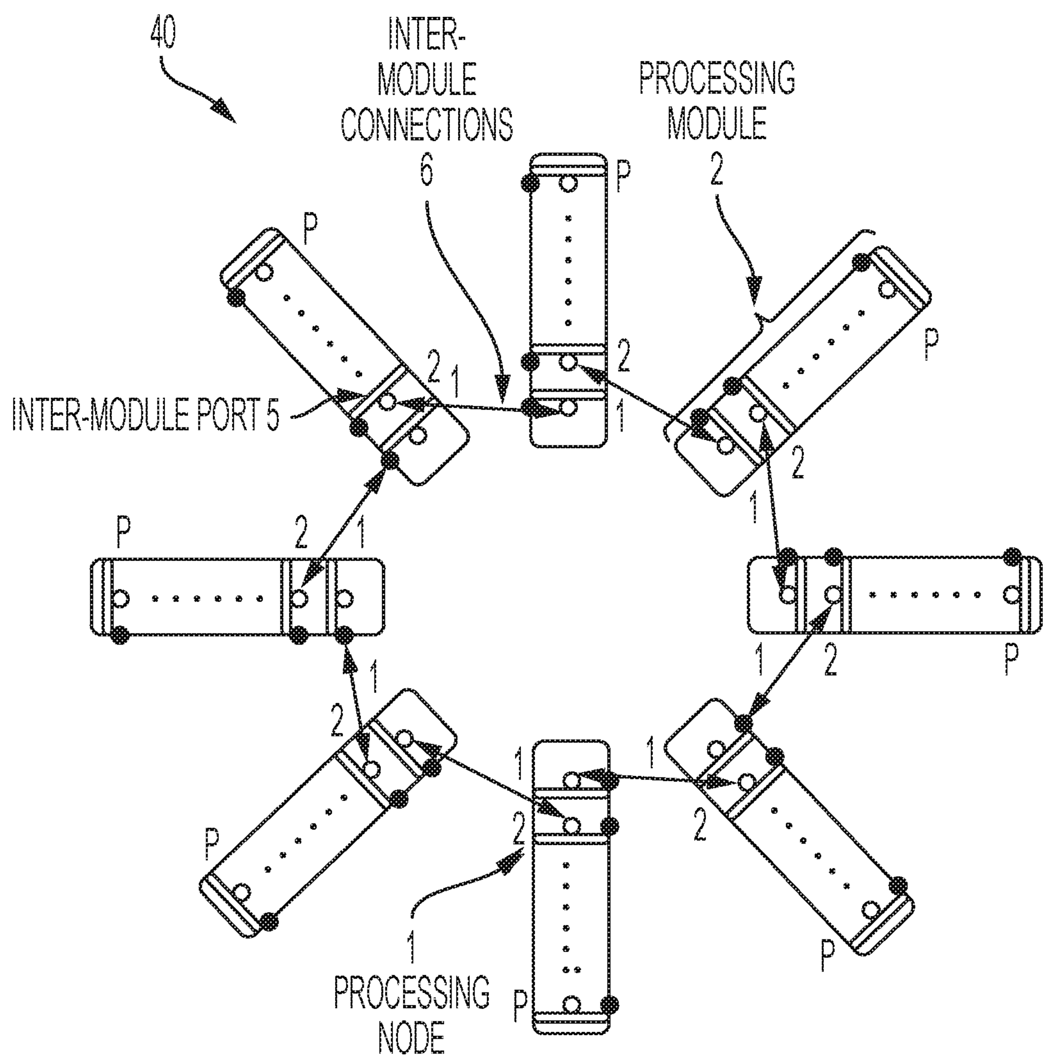
FIG. 4 is an illustration showing, by way of example, a ring system connection scheme, illustrated as a computing system framework that includes 8 processing modules (M=8).

The Basic Ring system. In one embodiment, inter-module ports located on one processing module are connected to inter-module ports located on other processing modules using a ring system. FIG. 4 is an illustration showing, by way of example, a ring system (40) connection scheme, illustrated as a computing system framework that includes eight processing modules (M=8). In the computing system framework that includes M processing modules, the ring system is implemented by connecting inter-module port 1 on processing module N to inter-module port 2 on processing module N+1 for N in [1, 2, . . . , M−1], and the inter-module port 1 on the processing module M to inter-module port 2 of the processing module 1. The port number or the module number can be trivially swapped without deviating from the ring system. Thus, using two inter-module ports per processing module, the ring system linearly connects all the processing modules in the computing system in a head-to-tail fashion, and closes the linear sequence into a circle by linking the last processing module to the first processing module. This scheme has the advantage of connecting together all the processing modules within a computing system framework using only two inter-module ports per processing module. However, since the number of the processing modules in a system tends to be large, the number of hops to travel from one processing module to another in a basic ring system may be large (the maximum number of hops is M/2 if a packet may travel on either direction along the ring; the maximum number of hops is M if a packet may only travel in one direction along the ring). A large number of hops leads to long latencies. This problem can be alleviated by introducing further connections within the ring of processing modules, as further described infra.

Figure 5:
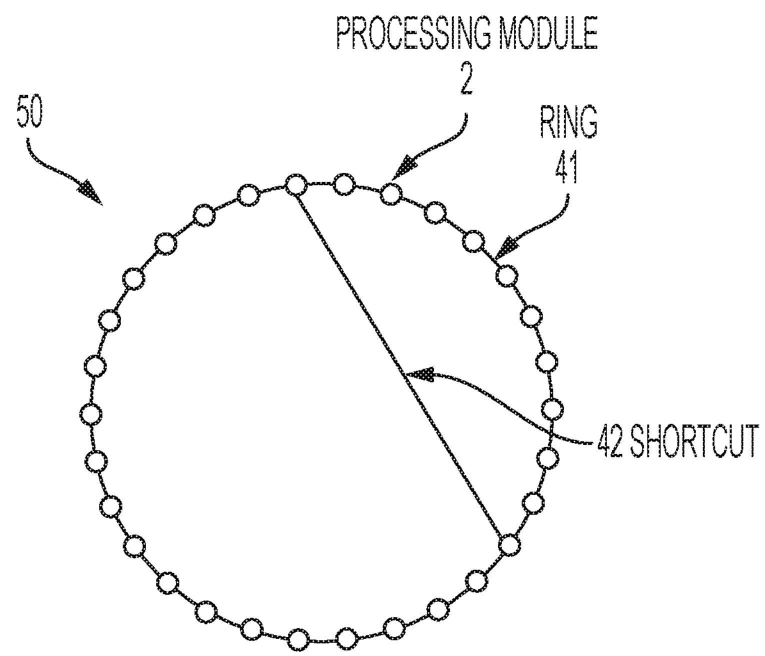
FIG. 5 is an illustration showing, by way of example, a ring system connection scheme with a shortcut.

The Ring System with Shortcuts. In a further embodiment, a computing system framework is implemented with a basic ring system. Furthermore, a connection is made between two processing modules on the ring and not adjacent to each other, via one inter-module port located on one of the two processing modules and not used for the linear connection, to another inter-module port located on the other of the two processing modules and not used for the linear connection. FIG. 5 is an illustration showing, by way of example, a ring system connection scheme with a shortcut. On the ring (41) formed by linearly connected processing module (2), two non-adjacent processing modules is connected via inter-module connection to form a short cut (42). The shortcut (42) may cut down the latencies for some; however, the shortcut (42) may or may not match the data packet traffic patterns well.

In one embodiment, the shortcuts are formed randomly. In another embodiment, multiple shortcuts are formed. In still another embodiment, the shortcuts are formed by choosing two processing modules in accordance to a data traffic pattern. In still another embodiment, the shortcuts are amended by choosing two processing modules in accordance to a data traffic pattern.

Figure 6:
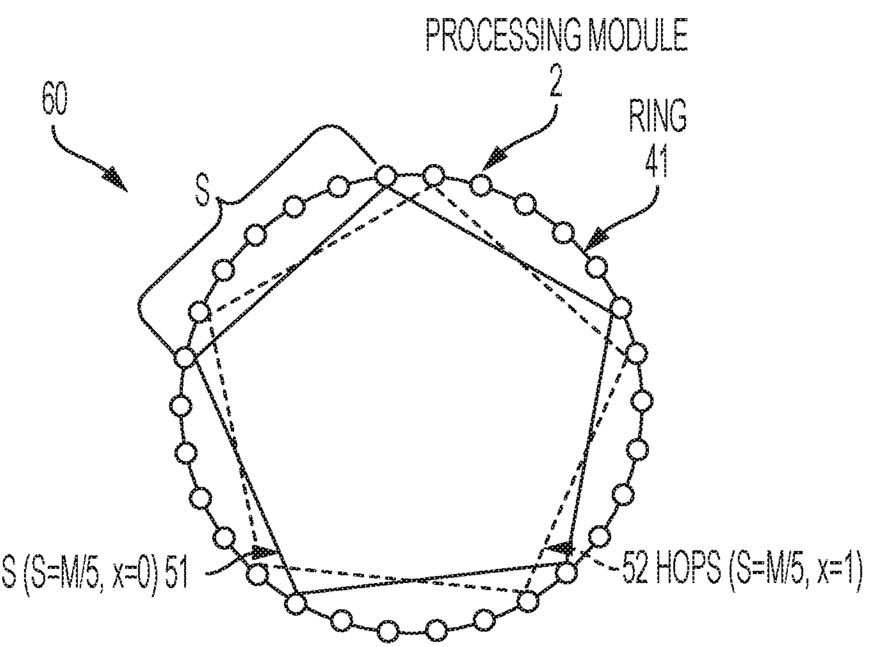
FIG. 6 is an illustration showing, by way of example, a ring system connection scheme with hops by the steps of S.

Ring System with Hops by the Steps of S. In a further embodiment, a computing system framework is implemented with a basic ring system with M processing modules. Furthermore, port P on processing module N is connected to port P+1 on processing module N+S where S is an integer divisor of M, N is [x, x+S, x+(M−S), increment by S], and x is [0, 1, 2, . . . , S−1]. These connections allow data packets to travel around the ring in steps of size S. FIG. 6 is an illustration showing, by way of example, a ring system connection scheme with hops by the steps of S. For illustration purposes, a five-step hop is shown. S, the size of the steps, equal to M/5. The pentagon with solid lines (51) represents the five-step hop with x equals to zero. The pentagon with dotted lines (52) represents the five-step hop with x equals to 1. Whereas the value of x is ranged from 0 to S−1, at least one of the values of x is used, so that at least one series of hops by the steps of S is present on ring. The more values of x are used, the more series of hops are created and potential bottlenecks are further reduced, but the fewer ports are available for other shortcuts.

Figure 7:
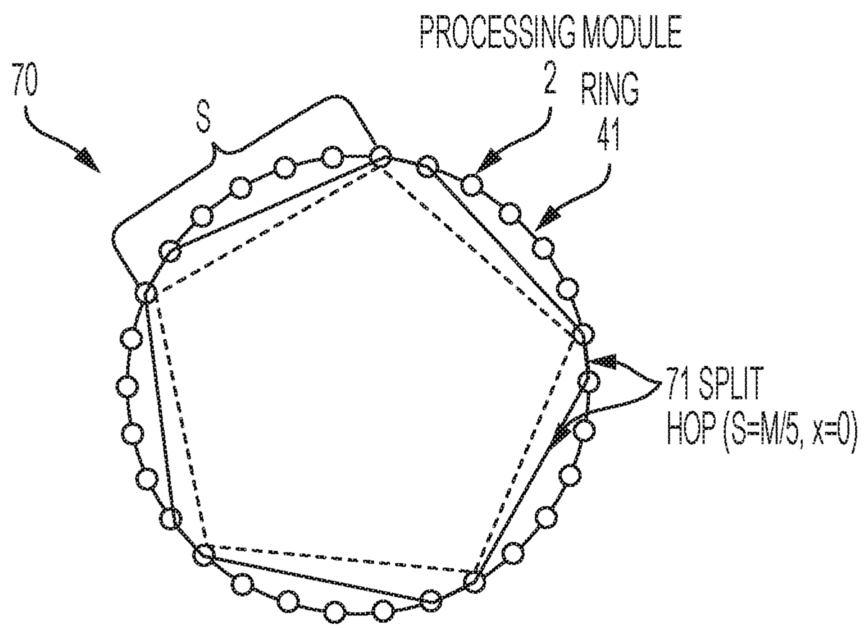
FIG. 7 is an illustration showing, by way of example, a ring system connection scheme with split hops by the steps of S.

Ring System with Split Hops by the Steps of S. In a further embodiment, a computing system framework is implemented with a basic ring system with M processing modules. Furthermore, port P on module N is connected to port P on module N+S−1 where S is an integer divisor of M, the number of modules, N is [x, x+S, . . . , x+(M−S), increment by S], and x is [0, 1, . . . , S−1]. These connections allow data packets to travel around the ring in pairs of steps of length S−1 and 1, respectively. FIG. 7 is an illustration showing, by way of example, a ring system with split hops by the steps of S. For illustration purpose, a five-step split hop is shown. S, the size of the steps, equal to M/5. The first portion of the split hop has size S−1 and is represented by the longer solid straight lines (71). The second of the split hop is along the ring and has the size of 1 (71). The pentagon with dotted lines represents a resulting hops through the split steps. The connection scheme has the advantage of only using one additional port on each module by taking advantage of the ring constructed with ports 1 and 2. In this connection scheme no processing module requires more than three ports, but latencies are introduced.

Figure 8:
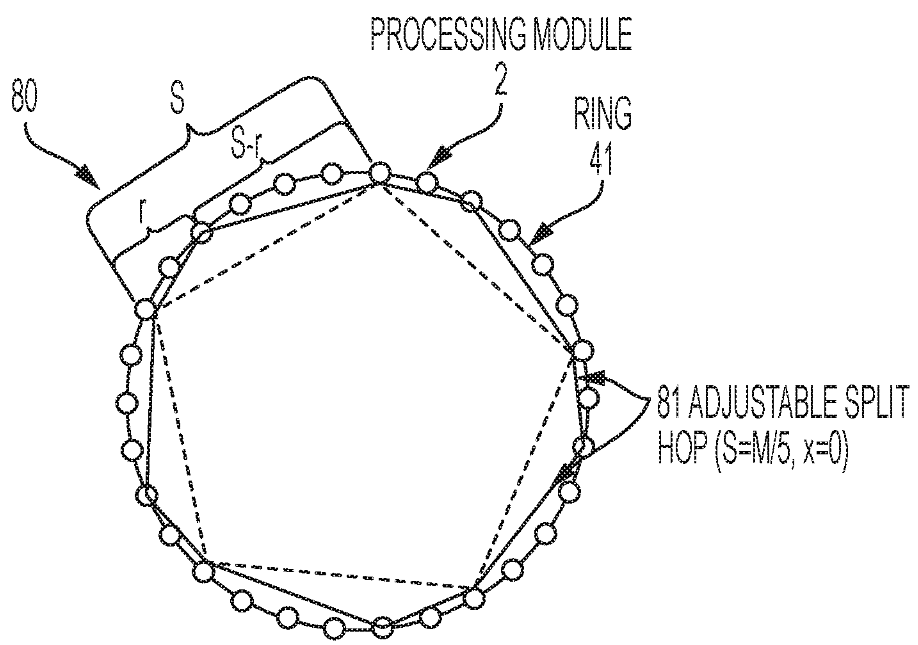
FIG. 8 is an illustration showing, by way of example, a ring system connection scheme with adjustable split hops by the steps of S.

Ring System with Adjustable Split Hops by the Steps of S. In a further embodiment, a computing system framework is implemented with a basic ring system with M processing modules. Furthermore, port P on module N is connected to port P on module N+S−r where S is an integer divisor of M, N is [x, x+S, . . . , x+(M−S), increment by S], and x is [0, 1, . . . , M/S−1]. These connections allow data packets to travel around the ring in pairs of steps of length S−r and r, respectively. FIG. 8 is an illustration showing, by way of example, a ring system with adjustable split hops by the steps of S. For illustration purpose, a five-step hop is shown. S, the size of the steps, is equal to M/5. The pentagon with dotted lines represents the aggregate hops of the steps of S. The solid straight lines represent the S−r hop and the r hop, together the S−r hop and the r hop forms the adjustable split hop by the steps of S (81). r is an integer with value of 1<r<S. This connection scheme has the advantage of only using one port on each module by taking advantage of the ring constructed with ports 1 and 2.

Incorporating Network Switches into the Connection Schemes. The connection schemes discussed supra may be implemented, at least partially, through the use of at least one of network switches or processing module-simulated switches, or a combination thereof. The network switch or the processing-module simulated switch may replace at least one of the cable links or direct links. The network switch or the processing-module simulated switch may also be installed in addition to the connection schemes implemented through the cable links or direct links as described supra. The network switch provides an additional flexibility by amending or increasing shortcuts in response to packet traffic patterns, among other utilities.

Some examples of incorporating one or more network switches into a system otherwise connected through cable links are described below. Other schemes, topologies, configurations, implementations, setups and combinations are possible, as known by one skilled in the art.

Figure 9:
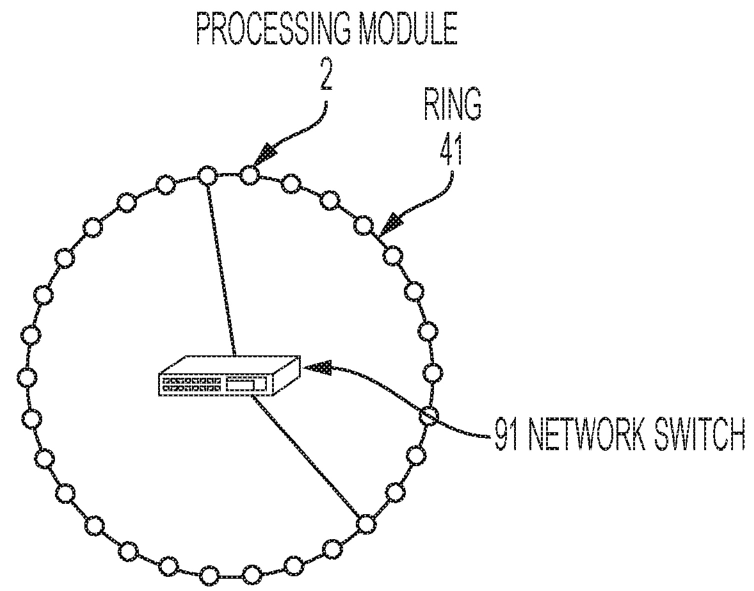
FIG. 9 is an illustration showing, by way of example, a ring system connection scheme with a shortcut implemented by a network switch.

In one embodiment, the shortcuts within a ring system connection scheme are formed with one or more network switches. FIG. 9 is an illustration showing, by way of example, a ring system connection scheme with a shortcut implemented by a network switch. The network switch (91) may replace cable links as shown in this embodiment; the network switch (91) may also supplement cable links (not shown).

Figure 10:
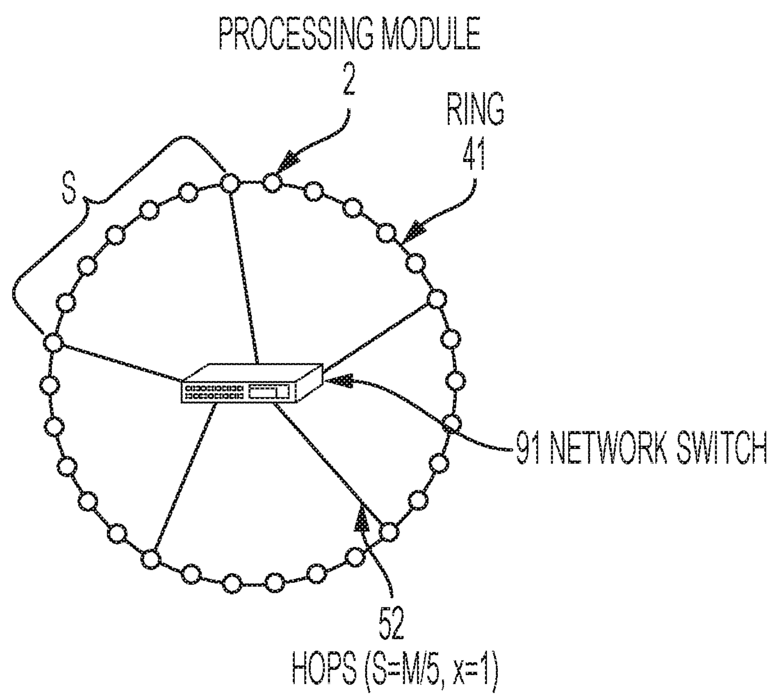
FIG. 10 is an illustration showing, by way of example, a ring system connection scheme with hops by the steps of S implemented by a network switch.

In a further embodiment, the shortcuts within a ring system connection scheme with hops by the steps of S are implemented by one or more network switches. FIG. 10 is an illustration showing, by way of example, a ring system connection scheme with hops by the steps of S implemented by a network switch. For illustration purposes, a five-step hop is shown. S, the size of the steps, equal to M/5. Depending on the size of the ring, more than one network switch may be used; but one network switch (91) is represented as an example. The processing modules N+0*S, N+1*S, N+2*S, . . . , N−S, are connected sequentially via the network switch. If data packets may traverse the ring and switch in both directions, the maximum hop count is S+1 (S/2 hops to get from the source processing module to the nearest connection to the network switch, 1 hop to go through the switch, and S/2 hops to go from a processing module connected to the network switch to the final destination processing module). The ring and network switch form a wheel and spokes paradigm, with the processing modules arranged around the outside of the wheel, the network switch aligned in the center, and connections from the network switch to every $S^{th}$ processing module forming the spokes. If S is large, shortcuts may be implemented with cable links. This addresses network latency while reducing the number of ports on the network switch.

Figure 11:
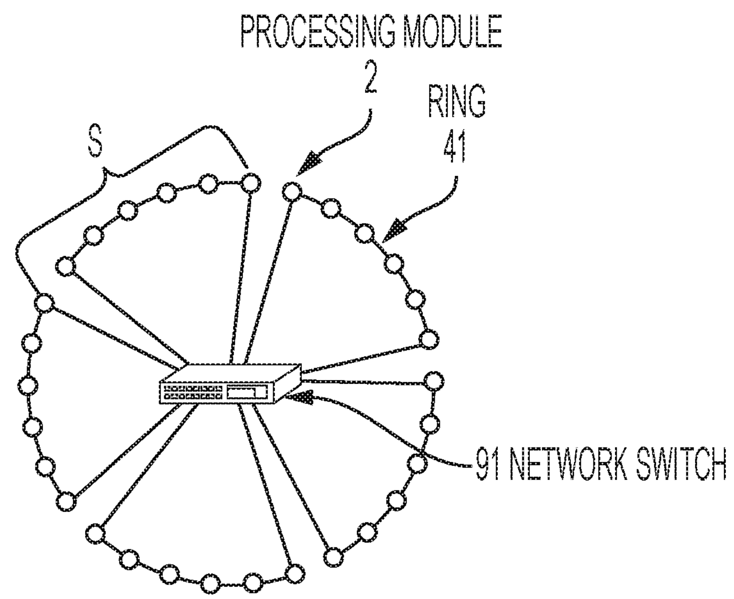
FIG. 11 is an illustration showing, by way of example, a ring system connection scheme with split hops by the steps of S implemented by a network switch.

In a still further embodiment, the shortcuts within a ring system connection scheme with split hops by the steps of S are implemented through one or more network switches. FIG. 11 is an illustration showing, by way of example, a ring system connection scheme with split hops by the steps of S implemented by a network switch. For illustration purposes, a five-step hop is shown. S, the size of the steps, equal to M/5. The processing module N and the processing module N+S−1 are connected to the network switch, where S is an integer divisor of M, the number of modules, N is [1, 1+S, . . . , 1+(M−S), increment by S]. The ring and network switch form a wheel and spokes paradigm, with the processing modules arranged around the outside of the wheel, the network switch aligned in the center, and connections from the network switch to every $S^{th}$ and $S^{th}$-1 processing modules forming the spokes. In addition, the connection scheme may remove those ring links between two adjacent processing modules that are both connected to the network switch. One advantage of this connection scheme is to limit the maximum number of required ports on a processing module to two. Finally, one or more network switches (not shown) could be used to connect another ring or external device, as will be described infra.

Figure 12:
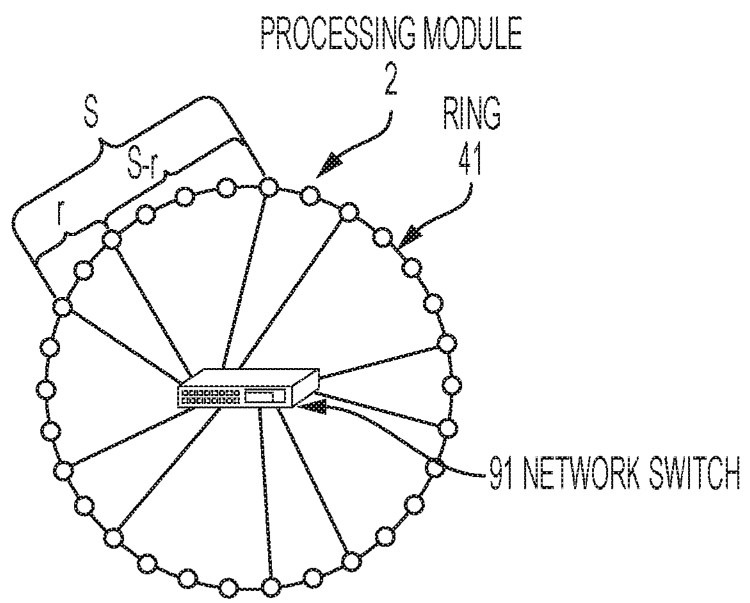
FIG. 12 is an illustration showing, by way of example, a ring system connection scheme with adjustable split hops by the steps of S implemented by a network switch.
Figure 13:
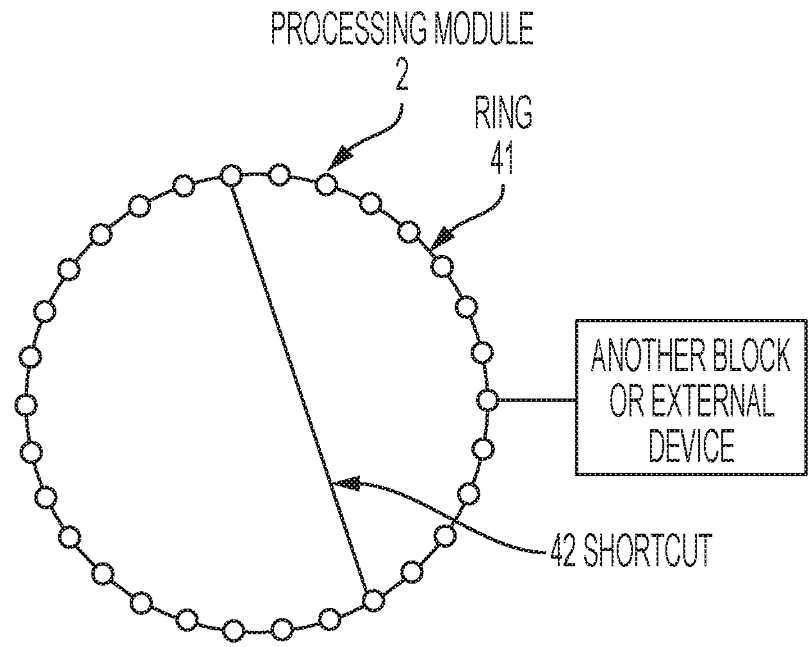
FIG. 13 is an illustrations showing, by way of example, a cable link that connects a block or external device to a ring system connection scheme with a shortcut.
Figure 14:
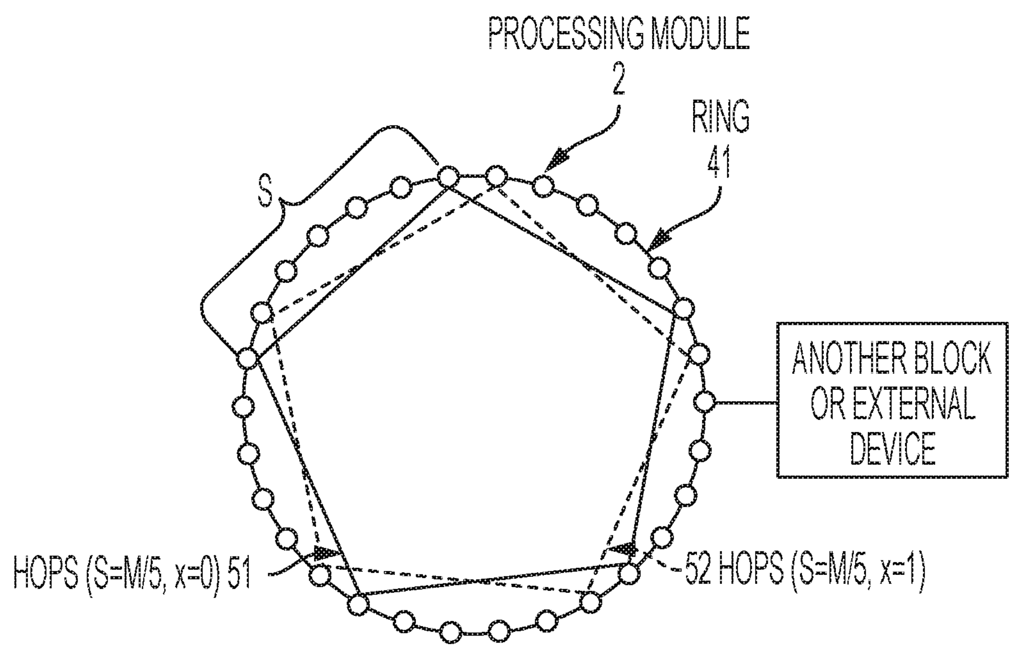
FIG. 14 is an illustrations showing, by way of example, a cable link that connects a block or external device to a ring system connection scheme with hops by the steps of S.
Figure 15:
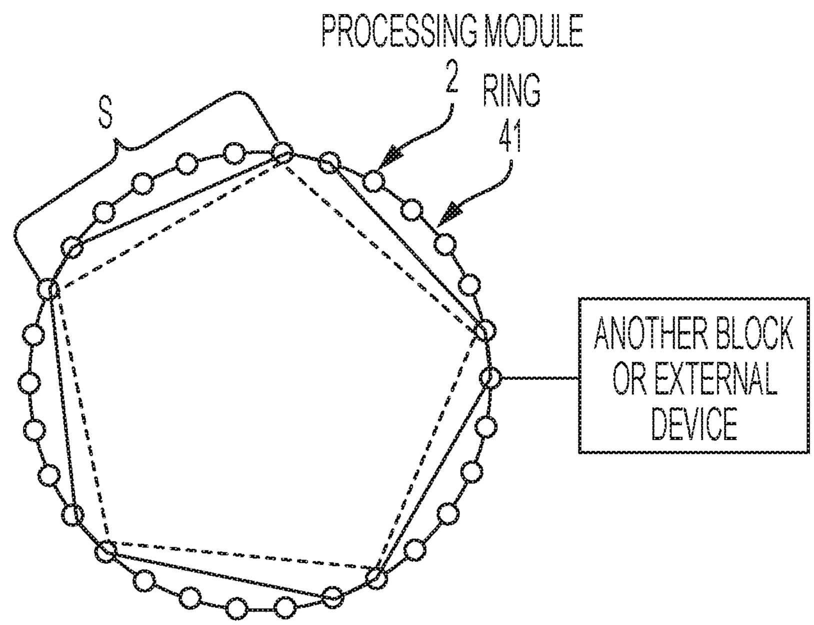
FIG. 15 is an illustrations showing, by way of example, a cable link that connects a block or external device to a ring system connection scheme with split hops by the steps of S.

In a yet further embodiment, the shortcuts within a ring system connection scheme with adjustable split hops by the steps of S are implemented by one or more network switches. FIG. 12 is an illustration showing, by way of example, a ring system connection scheme with adjustable split hops by the steps of S implemented by a network switch. For illustration purposes, a five-step hop is shown. S, the size of the steps, equal to M/5. The processing modules N, N+S−r, and are connected by a network switch, where S is an integer divisor of M, N is [1, 1+S, . . . , 1+(M−S), increment by S], and r is [2, 3, . . . , M/S−1]. If data packets may traverse the ring and switch in both directions, the maximum hop count is MAX((S−r), r)+1 (MAX((S−r),r)/2 hops to get from the source processing module to the nearest connection to the network switch, 1 hop to go through the switch, and MAX((S−r),r)/2 hops to get from a processing module connected to the network switch to the final destination processing module). The ring and network switch form a wheel and spokes paradigm, with the processing modules arranged around the outside of the wheel, the network switch aligned in the center, and connections from the network switch to every $S^{th}$ and $S^{th}$-r processing modules forming the spokes. In addition, one or more network switches (not shown) could be used to connect another ring or external device, as will be described infra.

The examples described supra do not cover all the possibilities. A network switch can be incorporated into other connection schemes, such as binary-spanning, random connections, or a combination of the connection schemes. In the examples described supra, the network switches connects two processing modules within a block, thus is located at the module level. However, a network switch can be implemented at a node level. A network switch can also be implemented at a block level, as will be described infra.

Finally, a network switch can be replaced by a processing module-simulated switch.

Constructing a Computing System with the Processing Modules and Blocks

A computing system, such as used in a datacenter, can be built from a cluster of the processing modules. Typically, the processing modules are connected through one of the connection schemes described supra to form a block. A computing system framework may be formed from multiple blocks, or even multiple layers of blocks where each layer contains multiple blocks. The computer systems thus constructed are scalable, agile, and fault-tolerant.

Figure 16:
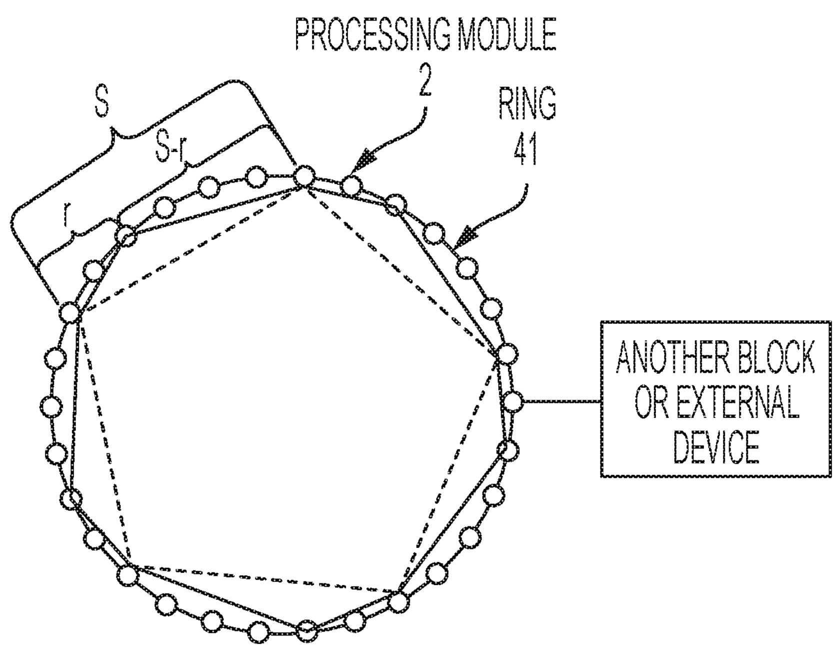
FIG. 16 is an illustrations showing, by way of example, a cable link that connects a block or external device to a ring system connection scheme with adjustable split hops by the steps of S.

In one embodiment, a connection between two blocks can be implemented through cables linking an inter-module port located on one processing module on one block to an inter-module port located on another processing module on the other block. FIGS. 13 to 16 are illustrations showing, by way of example, a cable link that connects a block or external device to a ring system connection scheme with a shortcut (FIG. 13), a ring system connection scheme with hops by the steps of S (FIG. 14), a ring system connection scheme with split hops by the steps of S (FIG. 15), and a ring system connection scheme with adjustable split hops by the steps of S (FIG. 16). The block's processing modules can be interconnected using a ring or other connection schemes. The external device can be a network switch. Other connection schemes and combinations are possible.

Figure 17:
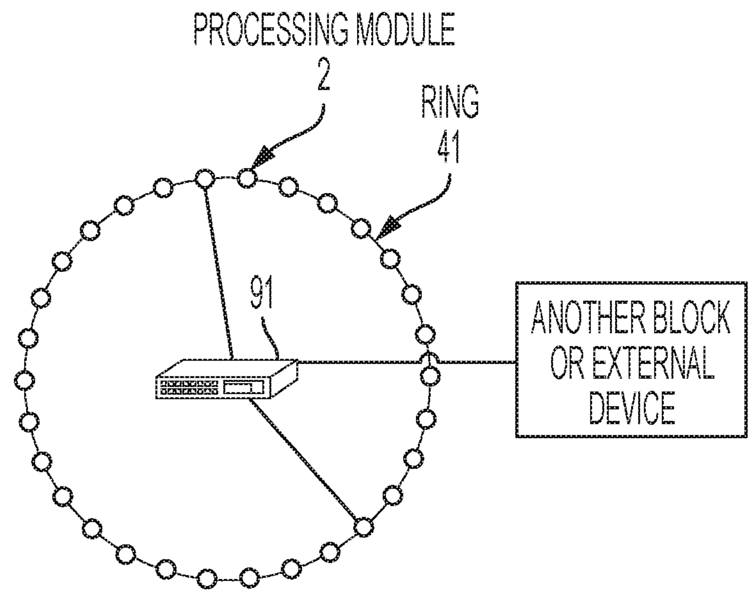
FIG. 17 is an illustration showing, by way of example, a connection from a block or external device to a ring system connection scheme with a shortcut implemented by a network switch.
Figure 18:
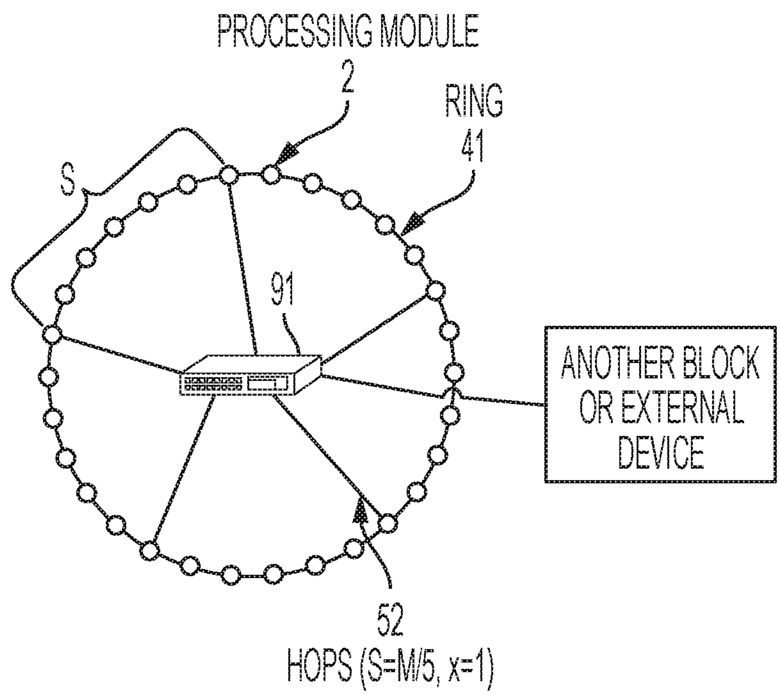
FIG. 18 is an illustration showing, by way of example, a connection from a block or external device to a ring system connection scheme with hops by the steps of S implemented by a network switch.
Figure 19:
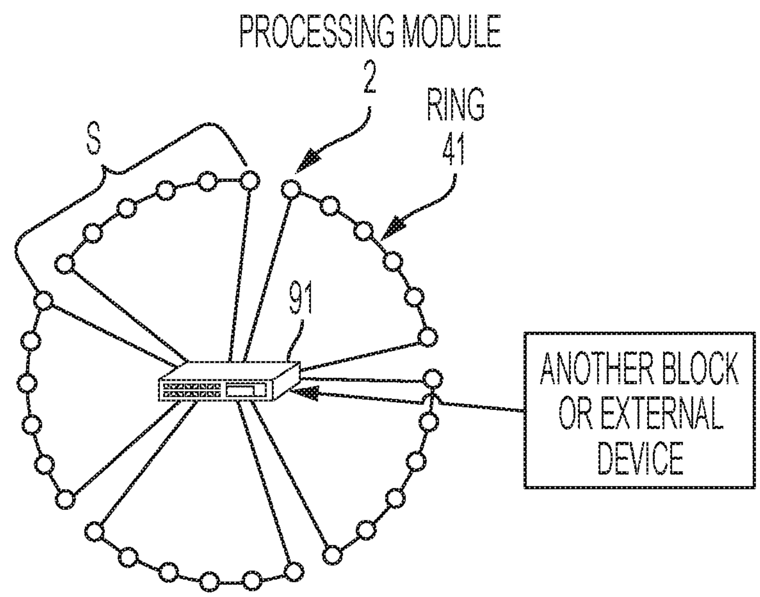
FIG. 19 is an illustration showing, by way of example, a connection from a block or external device to a ring system connection scheme with split hops by the steps of S implemented by a network switch.
Figure 20:
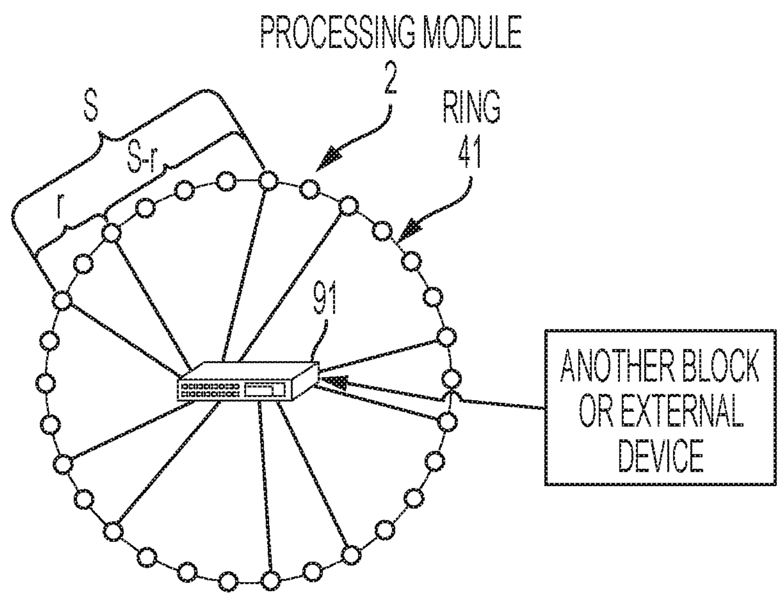
FIG. 20 is an illustration showing, by way of example, a connection from a block or external device to a ring system connection scheme with adjustable split hops by the steps of S implemented by a network switch.

Constructing a Computing System with the Processing Modules and Blocks, and Incorporating One or More Network Switches In another embodiment, a connection between two blocks can be implemented through a network switch implemented within a block. FIG. 17 is an illustration showing, by way of example, a connection from a block or external device to a ring system connection scheme with a shortcut implemented by a network switch. FIG. 18 is an illustration showing, by way of example, a connection from a block or external device to a ring system connection scheme with hops by the steps of S implemented by a network switch. FIG. 19 is an illustration showing, by way of example, a connection from a block or external device to a ring system connection scheme with split hops by the steps of S implemented by a network switch. FIG. 20 is an illustration showing, by way of example, a connection from a block or external device to a ring system connection scheme with adjustable split hops by the steps of S implemented by a network switch. The block's processing modules can be interconnected using a ring or other connection schemes. The external device can be a network switch. Other connection schemes and combinations are possible.

Thus, the two blocks can be connected with cables links, network switches, or a combination thereof. A computing system framework may include multiple blocks. Furthermore, a computing system framework may contain multiple layers of blocks, each layers of the blocks contains multiple interconnected blocks.

Using a Hybrid System to Connect Inter-Module Ports on One Processing Module to Inter-Module Ports on Other Processing Modules In one embodiment, inter-module ports located on one processing module are connected to inter-module ports located on other processing modules using a hybrid system. A hybrid system refers to a combination of two of more connection schemes. A group of processing modules that are inter-connected through a connection scheme, as described supra, is termed a block. A system may include multiple blocks formed from the same or a different scheme. In a further embodiment, processing modules are grouped into a number of blocks, each of which is internally connected using a binary spanning scheme. The blocks are interconnected using a ring scheme. In a still further embodiment, the blocks of the processing modules may be installed inside a rack or a set of racks. Finally, the established inter-module connections include at least one of a random connection, a binary spanning scheme, a ring scheme, a hybrid system, and a combination thereof.

Tuning the Computing System to Connect Inter-Module Ports on One Module to Inter-module Ports on Other Modules The connection schemes described supra may be further improved or modified by using a tuned system. In one embodiment, a computing system framework performs a task or an assignment that requires transferring a data packet from one processing node to another processing node through the established inter-module connections. A data packet traffic pattern is measured, traffic bottleneck is identified, and inter-module connections are amended based upon the packet traffic pattern to optimize the traffic flow.

The connection schemes and network topologies described can be adapted to network packet routing algorithms, including adaptive routing algorithm, non-adaptive routing algorithm, delta routing, multipath routing, and hierarchical routing.

While the invention has been particularly shown and described as referenced to the embodiments thereof, those skilled in the art will understand that the foregoing and other changes in form and detail may be made therein without departing from the spirit and scope of the invention.

What is claimed is:

1. A computing system framework, comprising:

a plurality of processing modules, each processing module comprising a plurality of processing nodes and each processing node associated with an intra-module port and an inter-module port;

a plurality of intra-module networks, each intra-module network comprising connections between at least a portion of the processing nodes in one of the processing modules via the associated intra-module ports;

a closed shape of the processing modules represented as M processing modules and formed by connecting at least one inter-module port on each processing module to one inter-module port on an adjacent processing module;

a network switch;

an inter-module network configured to form two or more connections between the closed shape of the processing modules and the network switch, each connection comprising at least one of:

a connection between the network switch and one of the processing modules N on the closed shape and another processing module N+S on the closed shape, by connecting one unused inter-module port on the processing module N to the switch and by connecting another unused inter-module port on the processing module N+S to the network switch, wherein S is an integer divisor of M, N is [x, x+S, . . . , x+(M−S), increment by S], and xis [1, 2, . . . , S−1];

a connection between the network switch and one of the processing modules N on the closed shape and another processing module N+S−1 on the closed shape, by connecting one unused inter-module port on the processing module N to the network switch and by connecting another unused inter-module port on the processing module N+S−1 the network switch, wherein S is an integer divisor of M, N is [x, x+S, . . . , x+(M−S), increment by S], x is [1, 2, . . . , S−1]; and a connection between the network switch and one of the processing modules N on the closed shape and another processing module N+S−r on the closed shape, by connecting one unused inter-module port on the processing module N to the network switch and by connecting another unused inter-module port on the processing module N+S−r to the network switch, wherein S is an integer divisor of M, N is [x, x+S, . . . , x+(M−S), increment by S], x is [1, 2, . . . , S−1], and r is [2, 3, . . . , S−1]; and a cable linked between one of the inter-module ports of one processing module of the closed shape to an inter-module port of another processing module of a different group of interconnected processing modules, wherein the different group of interconnected processing module has a configuration that is same or different than the closed shape.

2. A computing system framework according to claim 1, wherein each processing node is selected from the group comprising:

a processing element, a memory controller, a memory, a storage controller, a storage device, interfaces to intra-module and inter-module ports, and a virtual node.

3. A computing system framework according to claim 1, wherein the closed shape comprises one of a bus, a ring, a star, a mesh, and a crossbar switch.

4. A computing system framework according to claim 1, further comprising:

a transmission module to transfer the data packets from one of the processing nodes to another one of the processing nodes via the connections.

5. A computing system framework according to claim 4, further comprising:

a monitoring module measuring a pattern of the data packet traffic; and a modification module to amend the connections based upon the packet traffic pattern.

6. A computing system framework according to claim 1, wherein the network switch is arranged in a center of the closed shape of processing modules.

7. A method for constructing a computing system framework, comprising:

accessing a plurality of processing modules, each processing module comprising a plurality of processing nodes and each processing node associated with an intra-module port and an inter-module port;

within each of one or more of the processing modules, connecting at least a portion of the processing nodes in that processing module via the associated intra-module ports;

forming a closed shape of the processing modules represented as M processing modules by connecting at least one inter-module port on each processing module to one inter-module port on an adjacent processing module;

forming two or more connections around between the closed shape and a network switch, comprising at least one of:

a connection between the network switch and one of the processing modules N on the closed shape and another processing module N+S on the closed shape, by connecting one unused inter-module port on the processing module N to the network switch and by connecting another unused inter-module port on the processing module N+S to the network switch, wherein S is an integer divisor of M, N is [x, x+S, . . . , x+(M−S), increment by S], and x is [1, 2, . . . , S−1];

a connection between the network switch and one of the processing modules N on the closed shape and another processing module N+S−1 on the closed shape, by connecting one unused inter-module port on the processing module N to the network switch and by connecting another unused inter-module port on the processing module N+S−1 to the network switch, wherein S is an integer divisor of M, N is [x, x+S, . . . , x+(M−S), increment by S], x is [1, 2, . . . , S−1]; and a connection between the network switch and one of the processing modules N on the closed shape and another processing module N+S−r on the closed shape, by connecting one unused inter-module port on the processing module N to the network switch and by connecting another unused inter-module port on the processing module N+S−r to the network switch, wherein S is an integer divisor of M, N is [x, x+S, . . . , x+(M−S), increment by S], x is [1, 2, . . . , S−1], and r is [2, 3, . . . , S−1]; and linking a cable between one of the inter-module ports of one processing module of the closed shape to an inter-module port of another processing module of a different group of interconnected processing modules, wherein the different group of interconnected processing module has a configuration that is same or different than the closed shape.

8. A method according to claim 7, wherein each processing node is selected from the group comprising:

a processing element, a memory controller, a memory, a storage controller, a storage device, interfaces to intra-module and inter-module ports, and a virtual node.

9. A method according to claim 7, wherein the closed shape comprises one of a bus, a ring, a star, a mesh, and a crossbar switch.

10. A method according to claim 7, further comprising:

transferring the data packets from one of the processing nodes to another one of the processing nodes via the connections.

11. A method according to claim 10, further comprising:

measuring a pattern of the data packet traffic; and amending the connections based upon the packet traffic pattern.

12. A method according to claim 7, wherein the network switch is arranged in a center of the closed shape of processing modules.

* * * * *